(12) United States Patent
Wood (10) Patent No.: US 10,184,204 B1
(45) Date of Patent: Jan. 22, 2019

(54) ADJUSTABLE VENT REGISTER DRYER

(71) Applicant: Wayde L. Wood, Gloucester, VA (US)

(72) Inventor: Wayde L. Wood, Gloucester, VA (US)

(*) Notice: Subject to any disclaimer, the term of this patent is extended or adjusted under 35 U.S.C. 154(b) by 0 days.

(21) Appl. No.: 15/638,763

(22) Filed: Jun. 30, 2017

(51) Int. Cl.
*D06F 57/12* (2006.01)
*D06F 57/06* (2006.01)
*F26B 3/02* (2006.01)

(52) U.S. Cl.
CPC .............. *D06F 57/12* (2013.01); *D06F 57/06* (2013.01); *F26B 3/02* (2013.01)

(58) Field of Classification Search
CPC .. D06F 57/12; D06F 57/06; F26B 3/02; F26B 3/06; F26B 21/00; F26B 23/001; A47B 45/00; A47F 5/0892; A47F 5/08
USPC ... 34/442, 443, 509, 87, 192, 194, 239, 240; 248/163.1, 163.2, 176.1, 174, 188.2; 211/113, 117, 118, 182, 123, 175, 207
See application file for complete search history.

(56) References Cited

U.S. PATENT DOCUMENTS

| | | | |
|---|---|---|---|
| 151,587 A * | 6/1874 | Hale | A47K 10/04 211/123 |
| 299,586 A * | 6/1884 | Sacks | A47G 25/743 211/113 |
| 411,938 A * | 10/1889 | Suggett | A47K 10/04 211/123 |
| 430,341 A * | 6/1890 | Gloekler | A47F 5/0892 211/117 |
| 509,242 A * | 11/1893 | Parks | D06F 57/12 211/1.3 |
| 581,931 A * | 5/1897 | Buck | D06F 57/12 211/94.03 |
| 883,053 A * | 3/1908 | Scully | D06F 57/12 211/94.03 |
| 950,859 A * | 3/1910 | Michaud | D06F 57/12 211/119.16 |
| 1,303,812 A * | 5/1919 | Anderson | A47H 1/13 211/123 |
| 1,425,459 A * | 8/1922 | Eggert | A47K 10/04 211/123 |
| 1,430,666 A * | 10/1922 | Mendle | A47F 7/26 211/162 |
| 1,586,065 A * | 5/1926 | Brown | D06F 57/12 211/1.3 |
| 1,751,280 A * | 3/1930 | Leitzenberger | D06F 57/12 12/142 A |

(Continued)

FOREIGN PATENT DOCUMENTS

| | | | | |
|---|---|---|---|---|
| CA | 2684706 A1 * | 5/2011 | ............ | D06F 57/12 |
| GB | 1119521 | * 7/1968 | | |

*Primary Examiner* — Jonathan Liu
*Assistant Examiner* — Devin K Barnett
(74) *Attorney, Agent, or Firm* — Peter J. Van Bergen (57) ABSTRACT

An adjustable drying device comprises four brackets that attach and mount to a vent register and hang vertically from the vent register, allowing a support tube to be inserted at the bottom of the brackets and at varying positions from the vent register and horizontal to the vent register. The support tube allows clothes hangers to hang from it, allowing for clothing and other articles to be naturally air-dried from the air emitted from the vent register and/or natural air flow from surrounding ambient air. In addition, clothing and other articles can be hung or dried over the support tube without the use of clothes hangers, and other items can hang from or be attached to the support tube freely.

6 Claims, 7 Drawing Sheets

(56) References Cited

U.S. PATENT DOCUMENTS

| | | | | |
|---|---|---|---|---|
| 1,859,594 A * | 5/1932 | Meyer | D06F 57/12 | 248/206.1 |
| 2,230,037 A * | 1/1941 | Hoeflich | D06F 57/12 | 211/106 |
| 2,267,014 A * | 12/1941 | Case | A47G 25/746 | 211/123 |
| 2,379,975 A * | 7/1945 | Luger | D06F 57/12 | 211/97 |
| 2,480,327 A * | 8/1949 | Idelsohn | A47G 25/32 | 211/113 |
| 2,567,434 A * | 9/1951 | Hoskings | A47K 10/06 | 211/113 |
| 2,964,196 A * | 12/1960 | Phillips | A47G 25/746 | 211/123 |
| 2,972,419 A * | 2/1961 | Zelen | A47G 25/16 | 211/113 |
| 3,079,004 A * | 2/1963 | Scott | D06F 57/12 | 211/119.009 |
| 3,132,745 A * | 5/1964 | Steiner | D06F 57/12 | 211/119.1 |
| 3,146,890 A * | 9/1964 | Cowper | D06F 57/12 | 211/119.009 |
| 3,178,033 A * | 4/1965 | Wirsing | A47K 10/14 | 211/119.009 |
| 3,206,037 A * | 9/1965 | Woolsey | D06F 57/12 | 211/119.15 |
| 3,521,757 A * | 7/1970 | Liebscher | D06F 57/12 | 211/1.3 |
| 3,606,018 A * | 9/1971 | Ruina | A47K 10/10 | 211/1.3 |
| 3,612,284 A * | 10/1971 | Stoltz | D06F 57/12 | 211/1.3 |
| 3,782,559 A * | 1/1974 | Wright | B62H 3/12 | 211/113 |
| 3,811,575 A * | 5/1974 | Boegehold | A47B 57/54 | 211/182 |
| 3,830,979 A * | 8/1974 | McIntosh | H04M 1/62 | 330/263 |
| 3,865,336 A * | 2/1975 | Robertson | A47B 61/00 | 108/29 |
| D242,254 S * | 11/1976 | Bernkrant | D25/64 | |
| 4,085,519 A | 4/1978 | Maskia | | |
| 4,086,709 A * | 5/1978 | Jackson | D06F 57/12 | 248/222.51 |
| 4,136,464 A | 1/1979 | Hay | | |
| 4,395,831 A * | 8/1983 | Nielsen | D06F 58/20 | 34/235 |
| 4,412,677 A * | 11/1983 | Viramontes | A63B 21/1645 | 182/206 |
| 4,771,895 A * | 9/1988 | Steiner | D06F 57/12 | 211/1.3 |
| 4,923,157 A * | 5/1990 | Belamiza | E04H 12/2261 | 248/156 |
| 4,997,093 A * | 3/1991 | Letteri, Jr. | D06F 57/12 | 211/119.008 |
| 5,019,126 A * | 5/1991 | Post | A47G 25/0685 | 211/100 |
| 5,090,578 A * | 2/1992 | Arnold | D06F 57/12 | 211/119 |
| 5,373,950 A * | 12/1994 | Marc | A47K 10/04 | 211/105.1 |
| 5,375,727 A * | 12/1994 | Lavi | D06F 57/12 | 211/119.01 |
| 5,394,619 A | 3/1995 | Kaplan | | |
| 5,553,722 A * | 9/1996 | Lam | A47K 10/04 | 211/99 |
| 5,632,099 A | 5/1997 | Seifert | | |
| 5,711,437 A * | 1/1998 | Flickinger | D06F 57/12 | 211/119.01 |
| 5,979,671 A * | 11/1999 | Pan | D06F 57/125 | 211/1.57 |
| 5,996,506 A * | 12/1999 | Woytovich | A47B 96/02 | 108/42 |
| 6,052,918 A * | 4/2000 | Oletzke | D06F 57/12 | 211/119.004 |
| 6,085,436 A * | 7/2000 | Peet | D06F 59/04 | 223/78 |
| 6,095,472 A * | 8/2000 | Hubbard | F24H 9/06 | 248/225.11 |
| 6,149,020 A * | 11/2000 | Gumpel | D06F 57/125 | 211/119.01 |
| 6,234,894 B1 * | 5/2001 | Goracke | F24F 13/082 | 454/290 |
| D499,284 S * | 12/2004 | Rafoth | D6/513 | |
| 7,152,535 B2 * | 12/2006 | Mikich | A47B 5/00 | 108/42 |
| D616,537 S | 5/2010 | Gosko-Sadowski | | |
| D648,091 S | 11/2011 | Southwick | | |
| 8,127,947 B2 * | 3/2012 | Chacon | B60R 9/00 | 211/123 |
| 8,419,515 B1 * | 4/2013 | Dillon | F24F 13/084 | 454/284 |
| 8,511,486 B2 * | 8/2013 | Mansor | A47B 43/00 | 211/117 |
| 8,827,232 B2 * | 9/2014 | Crowley | A47B 43/003 | 211/175 |
| 2004/0155509 A1 * | 8/2004 | Smith, Jr. | A47C 7/42 | 297/440.15 |
| 2004/0223891 A1 * | 11/2004 | Brown | A61L 9/125 | 422/124 |
| 2005/0150128 A1 * | 7/2005 | Wuster | D06F 57/125 | 34/239 |
| 2006/0070967 A1 * | 4/2006 | Schaubeck | A47B 43/003 | 211/187 |
| 2007/0111653 A1 * | 5/2007 | Endou | B60H 1/3421 | 454/155 |
| 2007/0194188 A1 * | 8/2007 | Johnson | H02G 3/126 | 248/218.4 |
| 2007/0205169 A1 * | 9/2007 | Fratilla | A47B 47/02 | 211/117 |
| 2007/0205173 A1 * | 9/2007 | Garman | D06F 58/00 | 211/188 |
| 2007/0298706 A1 * | 12/2007 | Hudon | F24F 13/15 | 454/256 |
| 2008/0119127 A1 * | 5/2008 | Stewart | F24F 13/082 | 454/256 |
| 2008/0168675 A1 * | 7/2008 | Garman | D06F 58/14 | 34/195 |
| 2010/0180462 A1 * | 7/2010 | Proskey | D06F 58/00 | 34/88 |
| 2010/0199513 A1 * | 8/2010 | Sanders | D06F 58/00 | 34/82 |
| 2010/0224581 A1 * | 9/2010 | Hsien | D06F 53/04 | 211/117 |
| 2011/0186533 A1 * | 8/2011 | Thrush | A47F 5/08 | 211/113 |
| 2011/0198307 A1 * | 8/2011 | Mansor | A47B 43/003 | 211/117 |
| 2011/0233163 A1 * | 9/2011 | Raddatz | D06F 57/12 | 211/85.3 |
| 2012/0067837 A1 * | 3/2012 | He | A47K 10/10 | 211/123 |
| 2012/0175331 A1 * | 7/2012 | Yu | A47B 43/006 | 211/119 |
| 2012/0186098 A1 * | 7/2012 | Williams | D06F 59/02 | 34/240 |
| 2013/0082115 A1 * | 4/2013 | May | F24F 13/1426 | 236/49.3 |
| 2013/0264300 A1 * | 10/2013 | Shaffer | A47F 5/0006 | 211/117 |
| 2014/0101963 A1 * | 4/2014 | Larabie | F26B 25/18 | 34/239 |
| 2014/0209695 A1 * | 7/2014 | Frank | F24F 13/075 | 236/49.3 |
| 2014/0326794 A1 * | 11/2014 | Frank | F24F 13/075 | 236/49.3 |

(56) References Cited

U.S. PATENT DOCUMENTS

| | | | |
|---|---|---|---|
| 2014/0338212 A1* | 11/2014 | Williams | F26B 23/04 |
| | | | 34/104 |
| 2014/0373493 A1* | 12/2014 | Cannon | F24F 13/28 |
| | | | 55/490.1 |
| 2015/0351572 A1* | 12/2015 | Carr | A47G 25/0685 |
| | | | 211/201 |
| 2016/0348705 A1* | 12/2016 | Selle | F16B 12/10 |
| 2017/0129313 A1* | 5/2017 | Avendano Arenas | |
| | | | B60H 3/0028 |
| 2017/0247831 A1* | 8/2017 | Hayes | D06F 58/26 |
| 2018/0009293 A1* | 1/2018 | Quintanar | A61L 9/122 |
| 2018/0066893 A1* | 3/2018 | Bing | D06F 58/20 |
| 2018/0266042 A1* | 9/2018 | Worley | D06F 58/28 |

\* cited by examiner

Fig. 1

Fig. 4

ADJUSTABLE VENT REGISTER DRYER

FIELD OF THE INVENTION

The present invention relates to a novel, eco-friendly drying system for clothing and other articles utilizing vent registers and airflow from heating, ventilation, and air conditioning systems (HVAC) commonly found in residential and commercial structures. More particularly, the invention relates to a dryer device that attaches to a vent register on both ends by brackets that then support a tube that runs through the brackets upon which hangers with clothing and other articles can be placed for drying. The brackets in this instance are adjustable, allowing the length of the brackets to extend and support the support tube at its most extended configuration and furthest from the vent register.

BACKGROUND

Humans have been faced with the need to dry clothing and other articles in a fast, efficient, practical, and cost-effective manner since the beginning of civilization. The use of natural air to "air dry" clothing and other things was the first method developed. This simply consists of using natural air that comes into contact with wet articles, causing the water to evaporate over time.

Air drying articles of clothing is enhanced by increasing the surface area of the specific article exposed to air flow. In addition, increasing the speed, movement, and temperature of the air flow will also cause clothing to dry at a faster rate.

Various devices were created to utilized natural air flow, including clothes lines, clothes racks, etc. None of these, however, capture the air flow emitted from a HVAC system, which are used in millions of homes in the United States and internationally.

Over time and with the advent of electricity, new devices such as electric clothes dryers began to replace traditional methods of air drying clothing. The use of these electrical devices, however, incorporate high heat and significant cost due to electricity usage. Clothes dryers also damage clothing, as evidenced by lint that accumulates in dryers after use, which is actually particles of clothing that are removed due to the heat and rough process used.

Therefore, a need exists in the field of clothes drying for a novel device that can capture and utilize the air flow from a HVAC system emitted from a vent register that allows for clothing and other articles to hang from it loosely and on hangers.

BRIEF SUMMARY OF INVENTION

The following summary is intended solely for the reader and is not intended to be limiting in any way. The present invention provides a new, adjustable drying device that utilizes natural air flow to provide environmental, efficiency, and economic benefits over electronic drying devices and other traditional means and methods of drying clothing and other articles. In accomplishing this, the present invention is comprised of hardware that is attached to a vent register that allows the operator to adjust the height of the support tube on which clothing and other articles attach to it. This, in turn, allows the distance of the articles from the vent register to be regulated and easier to access by users. In preferred embodiments, the various elements of the adjustable vent register dryer consists of two adjustable metal brackets supporting a tube that runs through holes in the brackets, with the clothing and articles being allowed to hang freely from the tube.

Other objects, features and advantages of the present invention will become apparent from the detailed description taken in conjunction with the accompanying drawings.

BRIEF DESCRIPTION OF THE DRAWINGS

The embodiments and characteristics of the present invention, while illustrated as an example and not limited in any way by the accompanying drawings, will be particularly pointed out in the claims. The present invention itself and manner in which it may be made and used may be better understood after a review of the following description in connection with the accompanying drawings.

DETAILED DESCRIPTION OF THE INVENTION

Reference is made herein to the attached drawings. The terminology used herein is used for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which the invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present disclosure is to be considered as an exemplification of the invention, and is not intended to limit the invention to the specific embodiments illustrated by the figures or description below.

Referring now to FIGS. 1-7, there are shown various views of the adjustable vent register dryer device representing preferred embodiments.

The device 1 is one that can be used to conveniently and efficiently attached to a vent register so that clothing and other articles can hang from it, at adjustable lengths so as to control airflow, with or without the use of clothing hangers to dry clothing and other articles using natural air flow and/or airflow being emitted from the register. The device 1 is suitable for attaching and hanging from a vent register (Marked as 2 for reference only) so that it is hanging freely in the air indoors, suitably positioned above the flooring and away from persons and otherwise not impeding daily life and household activities. This allows a user to utilize the device 1 in place of traditional clothing drying apparatuses such as racks and gas and electric dryers. The device 1 allows clothes hangers to hang from the support tube 4 to hang clothing and other articles. This makes the device 1 an extremely useful, efficient and environmentally friendly drying device, whereby the device 1 can be extended and adjusted using the variable lengths allowed for by the brackets 3 and slide brackets 6.

The device comprises two brackets 3 and two slide brackets 6 each with seven (7) manufactured holes (Marked as 11 for reference only) spaced an equidistant from one another along the length of the brackets 3, 6 that allow wing-nuts 9 and screws 8 to be inserted into a choice of two sets of holes to allow the desired length of the support tube 4 from the vent register. The holes 11 and all other parts can be machined, burned with plasma or laser, die-punched or water jet treated to obtain the desired result.

Figure 1:
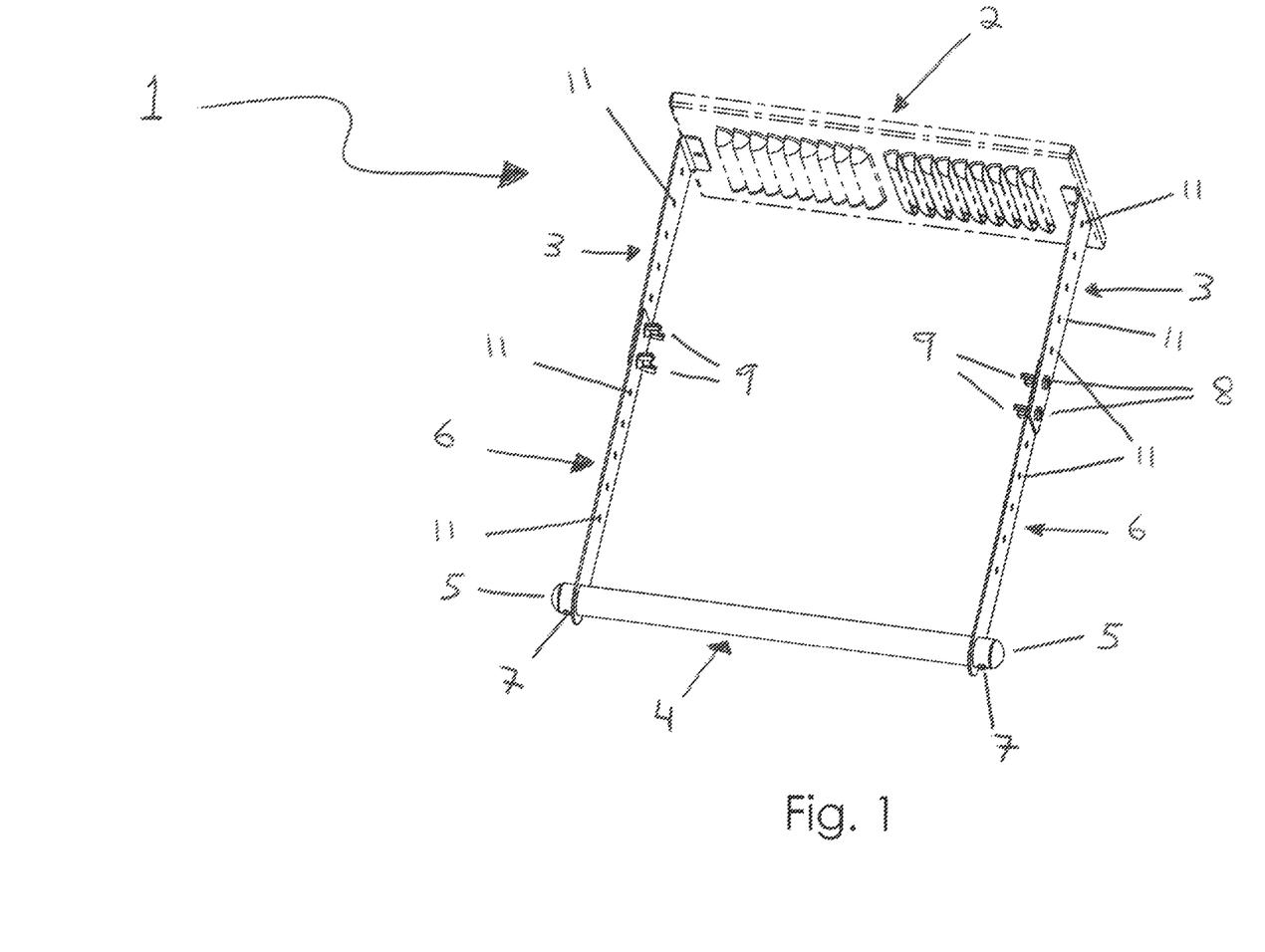
FIG. 1 depicts a front perspective view of an adjustable vent register dryer device with two adjustable brackets and a tube running through holes in both ends of both brackets allowing the tube to be secured.
Figure 2:
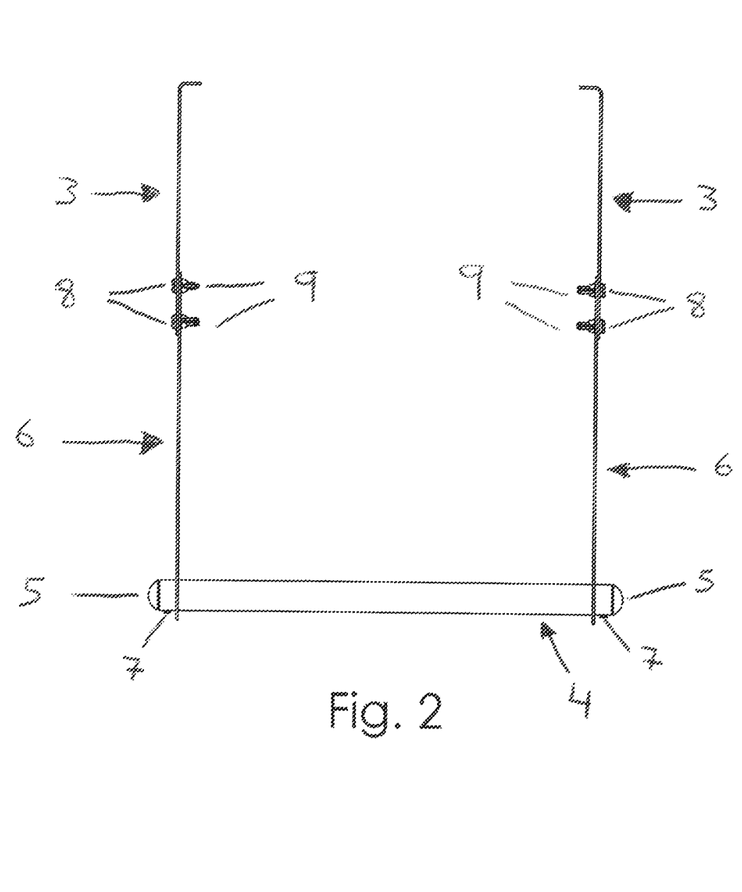
FIG. 2 depicts a side view of an adjustable vent register dryer device with the two adjustable brackets and tube running through holes in both ends of each bracket.
Figure 3:
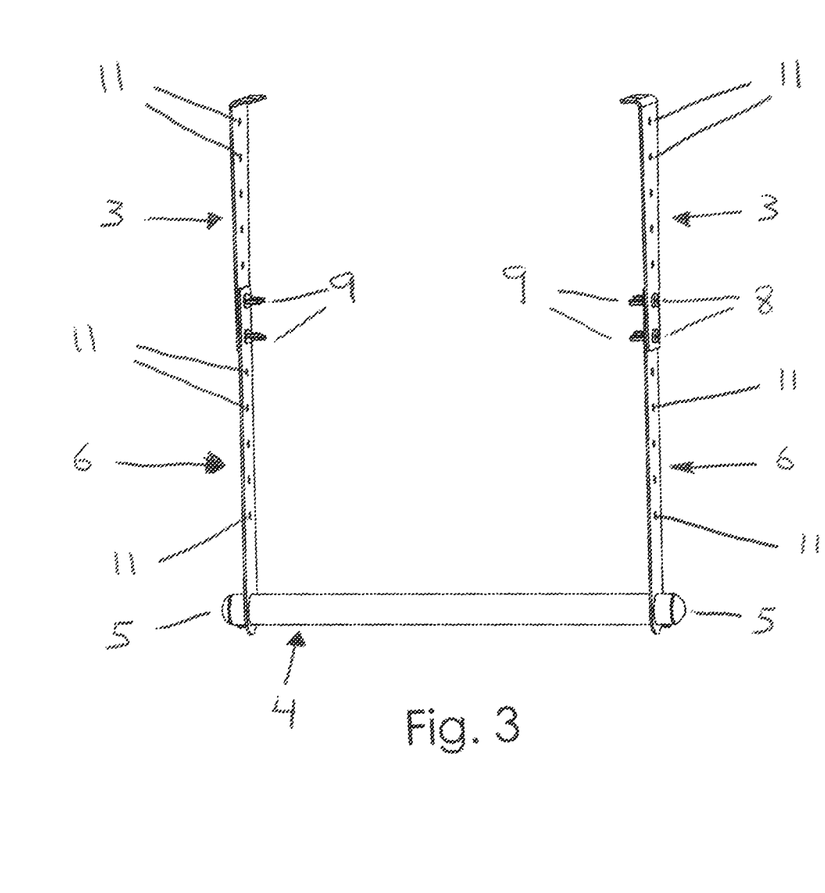
FIG. 3 depicts shows an angled perspective side view of the an adjustable vent register dryer device with the two adjustable brackets and tube running through holes in both ends of each bracket.
Figure 4:
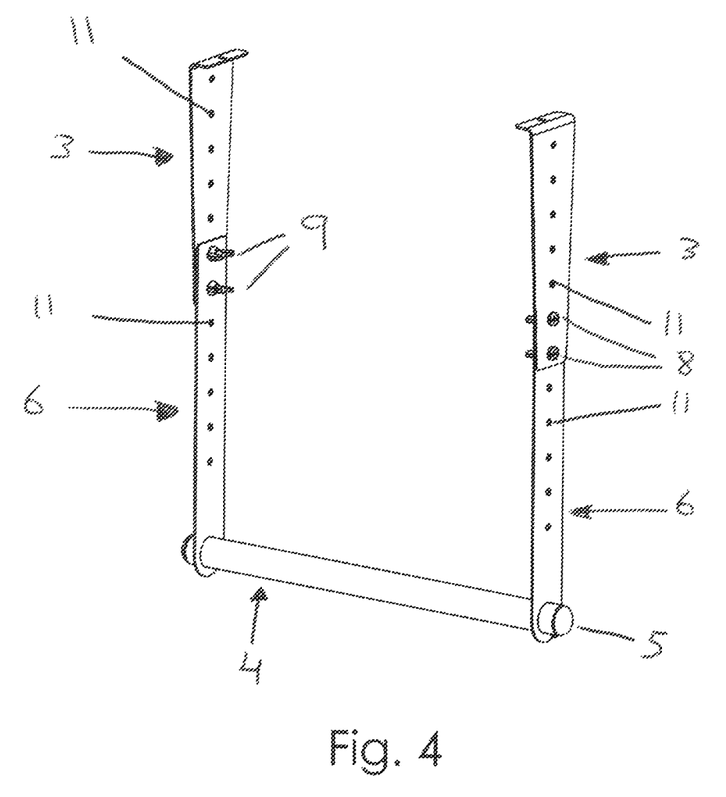
FIG. 4 depicts another angled perspective side view of the an adjustable vent register dryer device with the two adjustable brackets and tube running through holes in both ends of each bracket.
Figure 5:
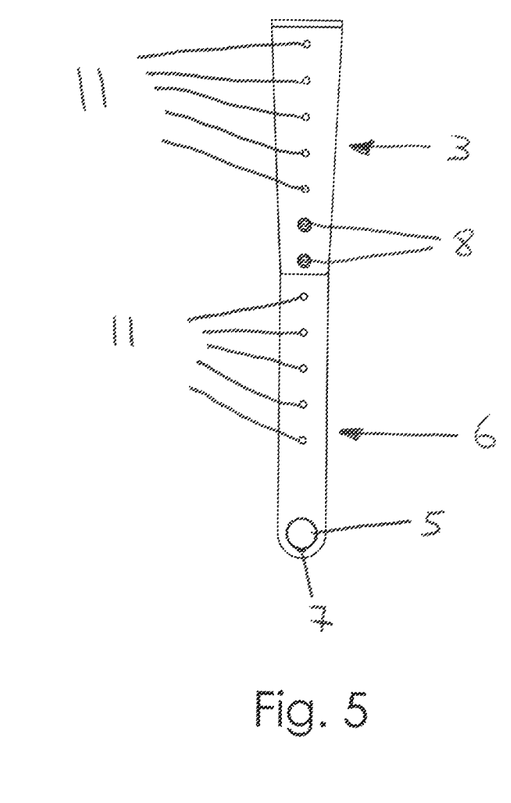
FIG. 5 depicts another side view an adjustable vent register dryer device with the two adjustable brackets and tube running through holes in both ends of each bracket.
Figure 6:
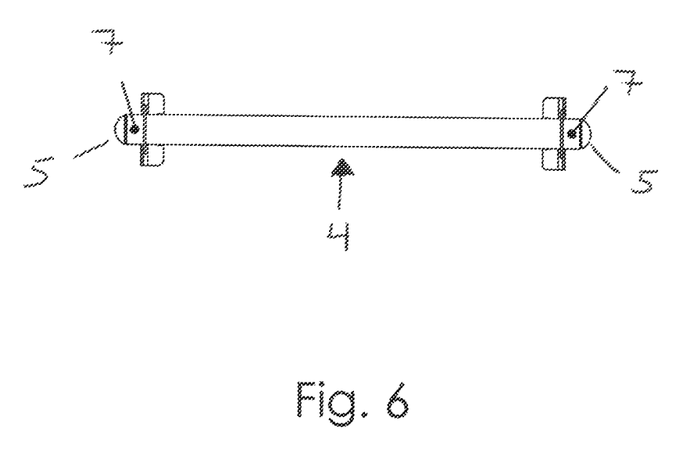
FIG. 6 depicts a bottom perspective view of the tube running through both holes of the two adjustable brackets of an adjustable vent register dryer device.
Figure 7:
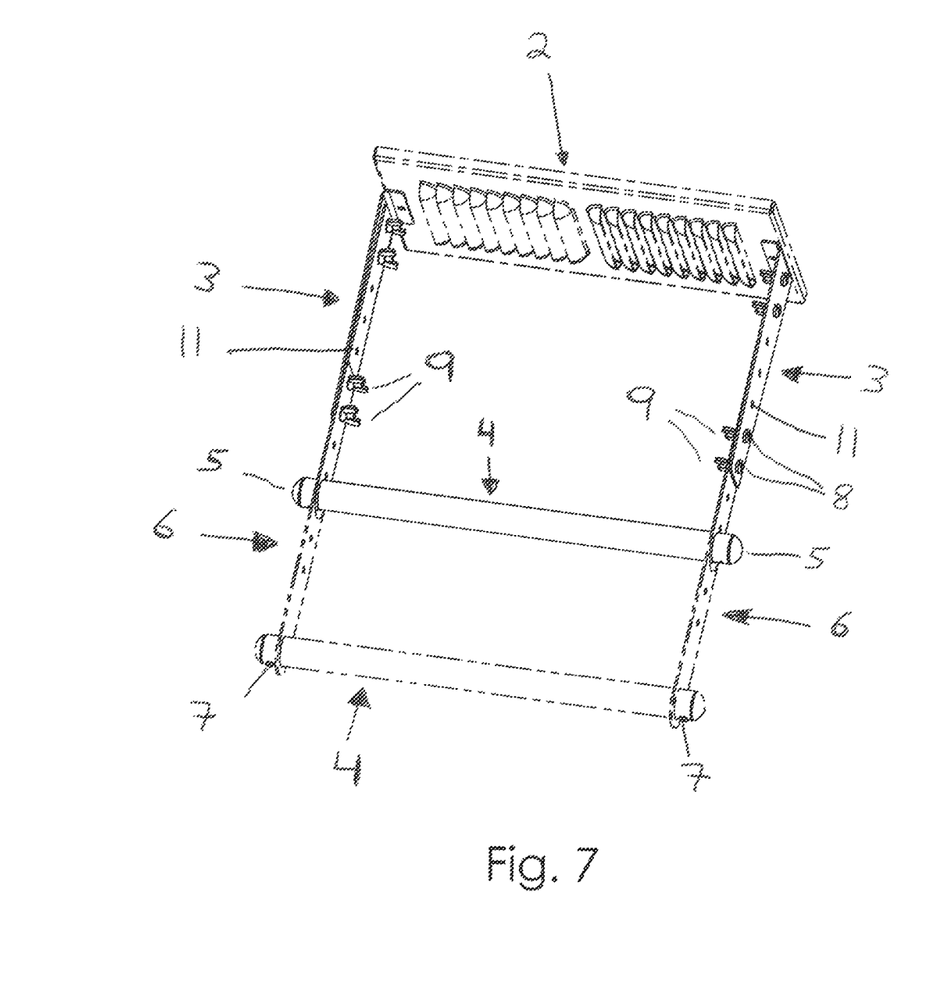
FIG. 7 depicts another angled perspective side view of the an adjustable vent register dryer device with the two adjustable brackets and tube running through holes in both ends of each bracket in two views: its shortest or least extended configuration; and, in phantom view, its most extended configuration.

As best depicted in FIG. 3, the two brackets 3 have a varying width that increases as it reaches one end. At the end of the two brackets 3 with the increasing width, the two brackets form a ninety (90) degree angle with a portion of the two brackets 3 curved inward. The portion of the two brackets 3 that curves inward is perpendicular to the rest of the two brackets 3 and contains a manufactured hole (Marked as 12 for reference only). These manufactured holes 12 found on both brackets 3 allow a screw 10 to be inserted through them and attached and mounted to the vent register which the device 1 is being attached to.

Either before or after the two brackets 3 are attached to the vent register, the two slide brackets 6 should be attached to the corresponding two brackets 3. This is done by utilizing any two of the same consecutive holes 11 on the brackets 3 and the two consecutive holes on the slide brackets 6. The desired sets of holes 11 on the brackets 3 and the two sets of holes on the slide brackets 6 are connected to each other by utilizing a wing-nut 9 and screw 8. The two desired sets of holes chosen for the brackets 3 and slide brackets 6 must correspond and are then aligned with each other so that the selected sets of holes are placed over each other so that the two wing-nuts 9 are inserted through the two sets of aligned holes and fastened together with the screws 8.

Either before or after the brackets 3 are attached to the slide brackets 6, the support tube 4 is inserted through manufactured holes (Marked as 13 for reference only) found at the bottom end of the two slide brackets 6. The support tube 4 has adjustable protruding screws 7 that keep the support tube 4 in place and centered between the two slide brackets 6 and a rounded end cap S on both ends.

While materials for elements for the device 1 have not been described, wood plastics, rubber, foam, metal alloys, aluminum, combinations thereof, and other materials may comprise some or all of the elements of the adjustable vent register dryer device 1.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationship variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications will readily occur to those skilled in the art, it is not desired to limit the invention to the exact construction and operation shown and described, and accordingly, all suitable modifications and equivalents may be resorted to, falling within the scope of the invention.

What is claimed is:

1. An adjustable drying device comprising: a vent register, two L-shaped mounting brackets, two adjustable sliding brackets, and a support tube configured to store clothes thereon; wherein a flange of each of the L-shaped mounting brackets attaches and mounts to opposite sides of the vent register so that each mounting bracket hangs vertically from the vent register towards a floor while being suspended in the air; wherein the adjustable sliding brackets attach to distal ends of the mounting brackets respectively opposite the flanges, the two sliding brackets also hanging towards the floor and suspended in the air; and the support tube is positioned at a bottom of the adjustable drying device between the two sliding brackets; each mounting bracket and each sliding bracket comprises a plurality of through holes which receive fasteners to attach each sliding bracket to a corresponding mounting bracket from said two mounting brackets;

wherein the flanges of each mounting bracket has a first width and the distal ends of each mounting bracket has a second width, wherein the first width is larger than the second width and each mounting bracket tapers from each flange to each distal end of each mounting bracket respectively.

2. An adjustable drying device as claimed in claim 1, wherein the holes of each mounting bracket and each sliding bracket are spaced apart at a set interval allowing the holes from each sliding bracket from said two sliding brackets to align with the holes of the corresponding mounting brackets from said two mounting brackets.

3. An adjustable drying device as claimed in claim 2, wherein each mounting bracket is connected to the corresponding sliding brackets respectively by aligning two sets of holes from said plurality of holes of each sliding bracket with two sets of holes from said plurality of holes of the corresponding mounting brackets respectively and inserting the fasteners though each of the two sets of holes respectively, wherein the fasteners are screws, and a wing-nut is secured to an end of each screw.

4. An adjustable drying device as claimed in claim 1, wherein each flange contains a flange hole that allows a screw to be inserted through each flange hole to attach and mount the mounting brackets to the vent register.

5. An adjustable drying device as claimed in claim 4, wherein each sliding bracket has an opening at a bottom end of each sliding bracket that allows the support tube to be inserted therethrough respectively, wherein the support tube is cylindrical.

6. An adjustable drying device as claimed in claim 5, wherein the support tube has adjustable protruding screws that keep the support tube in place and centered between the two sliding brackets.

\* \* \* \* \*